United States Patent
Tryba

[19]

[11] Patent Number: 6,112,579
[45] Date of Patent: *Sep. 5, 2000

[54] FLUID LEAKAGE SENSORS

[76] Inventor: Stephen A. Tryba, 201 Joan Ter., Trenton, N.J. 08629

[ * ] Notice: This patent issued on a continued prosecution application filed under 37 CFR 1.53(d), and is subject to the twenty year patent term provisions of 35 U.S.C. 154(a)(2).

[21] Appl. No.: 09/106,035

[22] Filed: Jun. 26, 1998

Related U.S. Application Data

[63] Continuation-in-part of application No. 08/917,405, Aug. 25, 1997, Pat. No. 5,992,218.

[51] Int. Cl.$^7$ .................................................. G01M 3/18
[52] U.S. Cl. .......................................... 73/40.5 R; 73/49.1
[58] Field of Search ............................. 73/40.5 R, 49.1

[56] References Cited

U.S. PATENT DOCUMENTS

| | | | |
|---|---|---|---|
| 2,759,175 | 8/1956 | Spalding | 73/40.5 R |
| 3,721,970 | 3/1973 | Niemoth | 73/40.5 R |
| 3,882,382 | 5/1975 | Johnson | 73/49.1 |
| 4,332,170 | 6/1982 | Belval et al. | 73/40.5 R |
| 5,267,670 | 12/1993 | Foster | 73/40.5 R |

*Primary Examiner*—Daniel S. Larkin
*Attorney, Agent, or Firm*—Martin Sachs, Esq.; Samuel Louis Sachs, Esq.

[57] ABSTRACT

A conductive fluid leakage sensor capable of detecting a leak from a first electrically conductive or non-conductive container with a conductive liquid disposed therein, has a second or outer electrically conductive coating surrounding a first conducting or non-conducting inner container. An electrical connection is made between the outer member and to the conductive fluid disposed within the container, so that conductive fluid leaking from the container that comes into contact with the outer electrically conductive coating creates a pulse, which may be sensed by a sensing apparatus providing an indication thereof.

10 Claims, 4 Drawing Sheets

FLUID LEAKAGE SENSORS

The present application is a continuation-in-part of application Ser. No. 08/917,405 filed Aug. 25, 1997, now U.S. Pat. No. 5,992,218.

BACKGROUND OF THE INVENTION

1. Field of the Invention

The present invention relates to fluid leakage sensing devices and, more particularly, to a conductive fluid leakage sensing device coupled to an electronic apparatus for indicating the initial occurrence of the conductive fluid leaking from a container.

2. Discussion of the Relevant Art

The prior art contains many liquid leakage systems that provide alarms when a leaking liquid is detected. Typical of these devices is that disclosed in U.S. Pat. No. 2,691,134 issued to C. J. Ford on Oct. 5, 1954, which requires a plurality of sensing devices disposed along the seams of a large reservoir, such as in an airplane gasoline tank. Should the leak occur at one of the seams, the sensor provides an indication that may be read on a meter.

U.S. Pat. No. 4,206,632 issued to Suzuki on Jun. 10, 1980 discloses a liquid leak detecting device that includes two electrical conductors arranged in parallel that is separated from each other by a material comprising a continuously porous polytetrafluoroethyleme (PTFE) that contains an electro-conductive material within its pores. The material disposed between the PTFE changes its resistance when contacted with a leaking liquid.

U.S. Pat. No. 5,203,202 issued to Spencer on Apr. 20, 1993 utilizes a layer of pliable conductive material between a conduit and signal carrying elements disposed along the length of the conduit. The conductive material is a layer of conductive tape wrapped around the conduit. Leakage of the gas from the pressured gas container causes a momentary ballooning of the conductive pliable layer, which upon contact with the exposed portion of the signal carrying elements alters the resistance between the conductors making up the signal carrying elements that is measured directly by the impedance changes.

The present invention overcomes the shortcomings of the prior art by providing a simple fluid leakage sensor and a sensing apparatus that utilizes the initial leakage of the conductive fluid to provide a pulse, which causes an indication on an output device.

SUMMARY OF THE INVENTION

A fluid leakage sensor, according to the principles of the present invention, includes an inner non-conductive member for containing a conductive fluid; a second or outer electrically conductive member, is disposed about the inner member. Electrical connections are made to the electrically conductive outer member and to the conductive fluid within the non-conductive container, which are adapted to be connected across a voltage source. A device for sensing the electrically conductive fluid leaking from the inner member to the outer member may include a device to provide an audible or visual indication of the fluid leakage.

Therefore, it is a primary object of the present invention to provide a fluid leakage sensor including an inner or first electrically non-conductive member for containing an electrically conductive fluid; an electrically conductive outer member, disposed about the first or inner member; electrical connections are affixed to the electrically conductive outer member and to the electrically conductive fluid within the non-conductive member, which are connected across a voltage source.

Another object of the present invention is to provide a fluid leakage sensing apparatus, which senses the leakage of a conductive fluid from the non-conductive member containing the fluid immediately upon its occurrence by sensing a change as the fluid passes between the fluid containing inner member and the outer member, providing an output that activates an audio or visual alarm, or any other selective output device such as a fluid flow control.

It is another object of the present invention to provide an apparatus for sensing leakage of conductive fluid from an inner container immediately upon the initial leakage of the electrically conductive fluid.

The foregoing and other objects and advantages will appear from the description to follow. In the description, reference is made to the accompanying drawings, which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims. In the accompanying drawing, like reference characters designate the same or similar parts throughout the several views.

BRIEF DESCRIPTION OF THE DRAWING

The subject matter, which I regard as my invention, is particularly pointed out and distinctively claimed in the concluding portion of the specification. My invention, itself, however both to its organization and method of operation, together with further obvious advantages thereof may be best understood by reference to the following description taken in connection with the following drawing, in which:

DESCRIPTION OF THE PREFERRED EMBODIMENT

Figure 1:
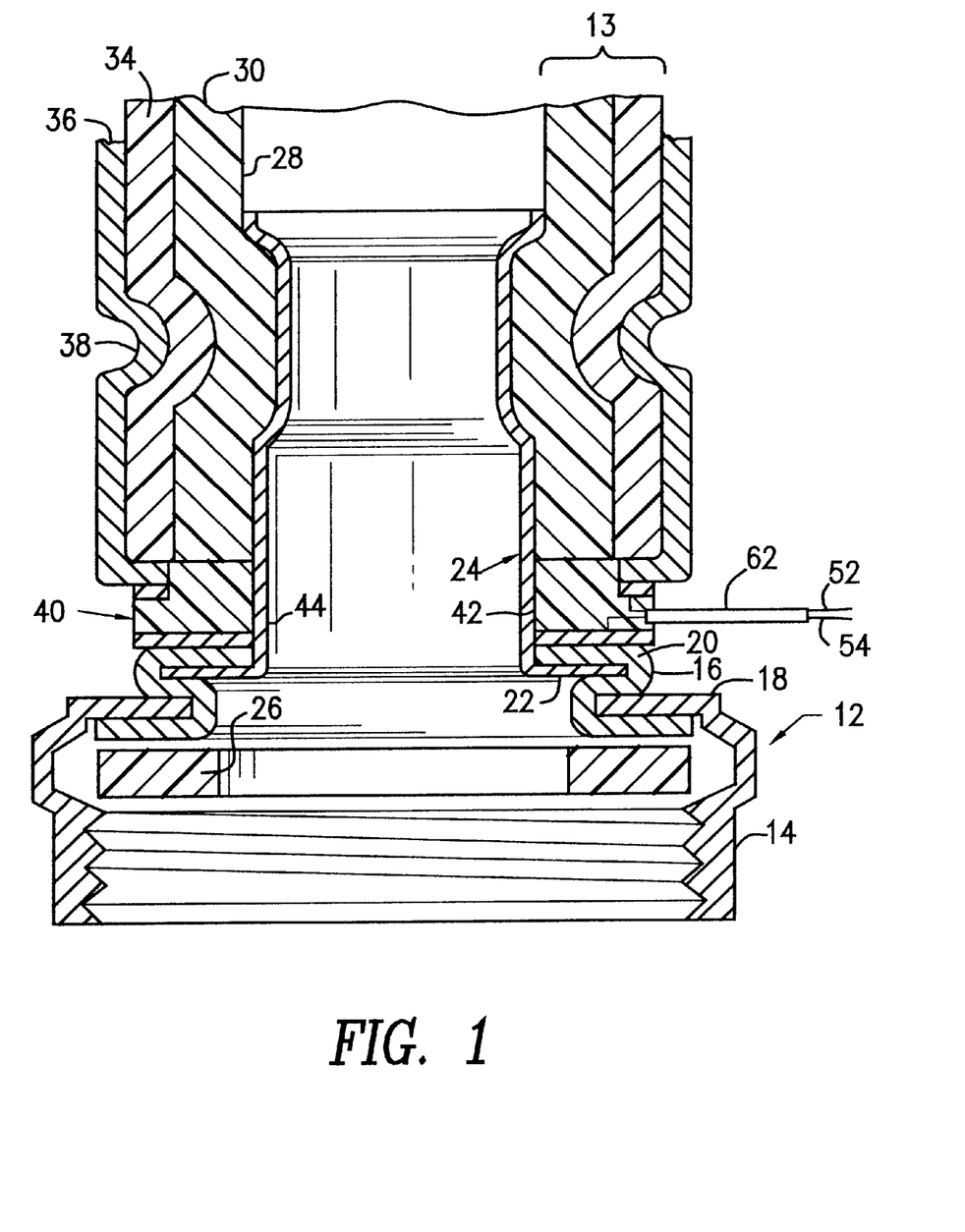
FIG. 1 is a greatly enlarged cross-sectional view of one end of the fluid carrying portion of the fluid leakage sensor, according to the principles of the present invention.

Referring now to the figures, and in particular to FIG. 1, there is shown an enlarged cross-sectional view of a coupling member 12 disposed on one end of a hose member 13 that is connected on the other end, not shown, to a reservoir in which a conductive fluid is stored, not shown, and which includes the same coupling member 12, that is typically connected in a conventional manner, to a cooperating threaded male connector, not shown. The coupling member 12 is electrically conductive, includes a threaded portion 14 that is adapted to be affixed to a male threaded portion, not shown, and an S-shaped member 16, shown in cross-section, which receives the other end 18 of the threaded portion 14 of the coupling member 12. The other end 20 of the S-shaped member 16 is adapted to receive the flared portion 22 of the electrically conductive ferrule 24.

Included within the threaded portion of the connector 14 is a conventional washer 26, which is used to make a sealing connection to the threaded male adapter inserted therein, not shown. The electrically conductive ferrule 24 is adapted to be inserted into the opening 28 provided in the non-conductive hose or inner member 30 and is designed to have a force fit when entering the opening 28 of the inner hose member 30.

Surrounding the inner hose member 30 is an electrically conductive outer hose member 34. The inner hose member 30 may be fabricated from a non-conductive rubber, nylon, or some other type of non-conducting plastic for flexibility. The outer member 34, may be fabricated from a rubber material, which includes a large percentage of carbon black to ensure that the outer member is electrically conductive.

Figure 3:
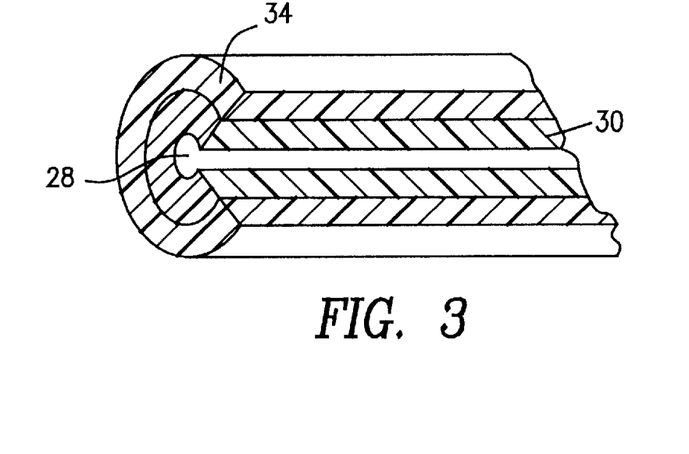
FIG. 3 is a partially broken away portion of a hose member utilized to carry a conductive fluid.

In order to rigidly affix the members 30 and 34 onto the conductive ferrule 24, an electrically conductive clamping ferrule 36 is used to join the members 30 and 34 rigidly to the conductive outer member 24, which may include a dimple 38 introduced by a clamping tool, not shown. A perspective view of the hose 13 is shown broken away in FIG. 3. It is important to note that although the electrically conductive ferrules 24 and 36 are mechanically affixed to hose member 13, they are electrically isolated so that there is no electrical continuity between them.

Figure 2:
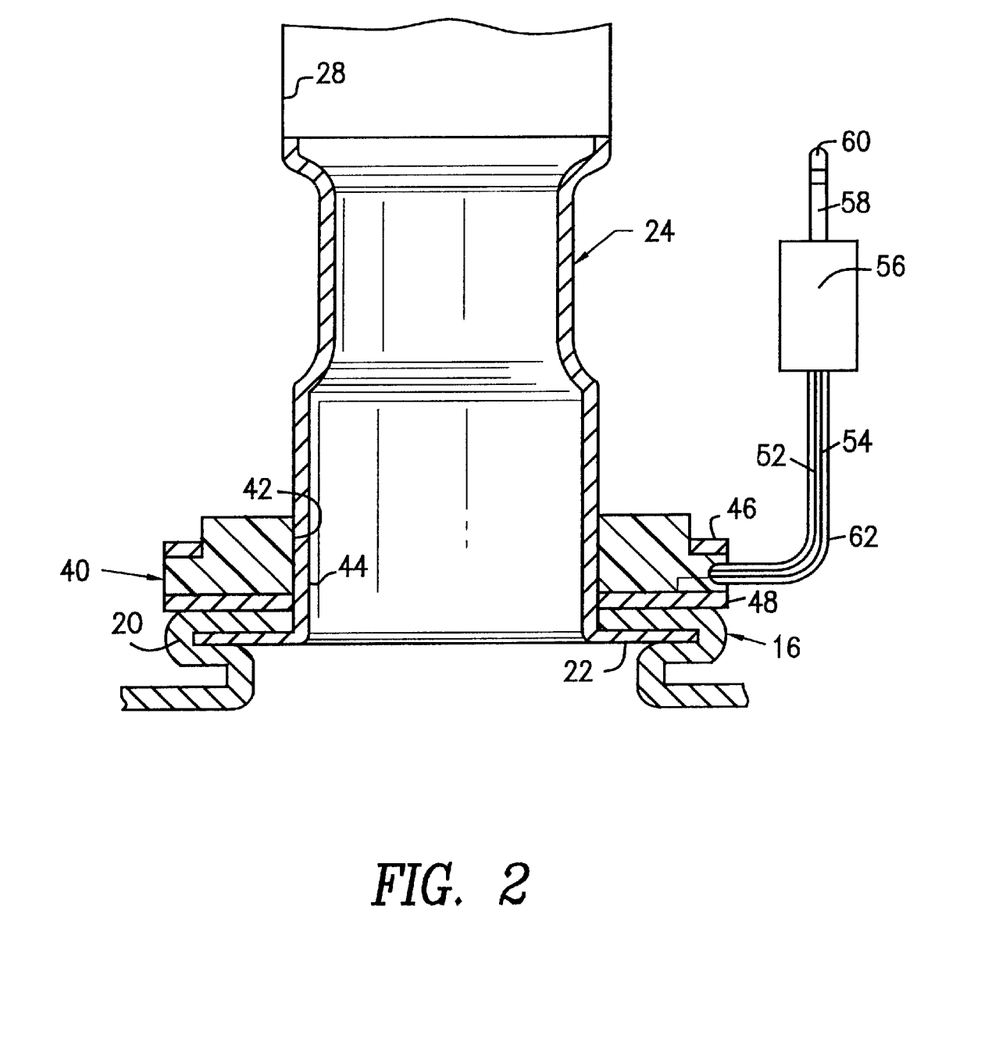
FIG. 2 is a greatly enlarged cross-sectional view of an electrically conductive ferrule disposed within the aperture of the fluid containing hose member.

Referring now to FIG. 2, which shows an enlarged view and the details of the assembly of the conductive ferrule 24 together with toroid member 40 and its connection to the upper and lower output wires 52 and 54, respectively, which may be included in a two conductor conventional cable 62.

Figures 4, 5:
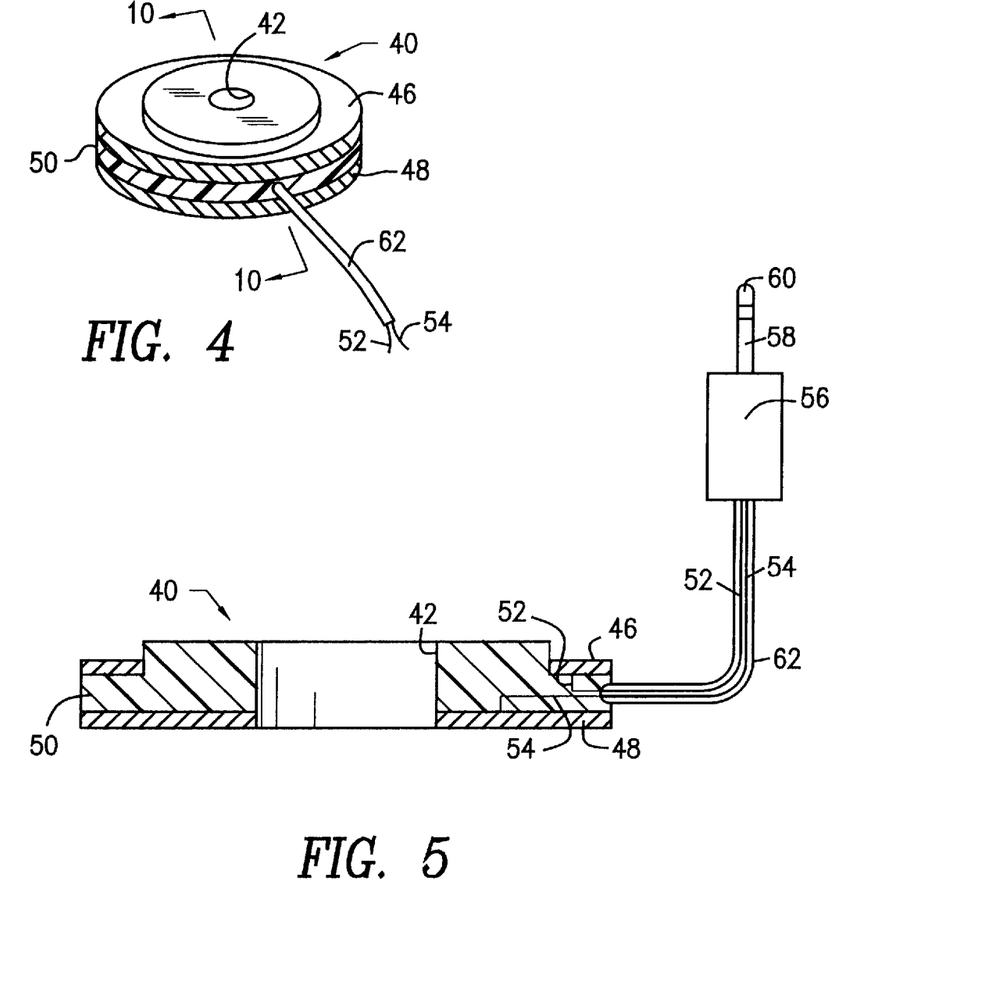
FIG. 4 is a perspective view of the conductive toroid member placed upon the electrically conductive ferrule shown in FIG. 2.
FIG. 5 is a cross-sectional view taken along the line 10-10 of FIG. 4.

The electrical contacts to the electrically conductive ferrules 24 and 36 are provided by a toroid shaped member 40 shown in perspective in FIG. 4, which has a centrally disposed opening 42, that receives the lower portion 44 of the electrically conductive ferrule 24, as seen in FIG. 2. The toroid 40 has an upper conductive surface 46, a lower conductive surface 48, and an insulated portion 50 disposed therebetween. The upper conductive surface 46 of toroid 40, provides an isolated electrical connection to the electrically conductive outer clamping ferrule 36, which in turn is connected to the electrically conductive outer hose member 34. The lower conductive surface 48 of toroid 40 provides an isolated electrical connection to the electrically conductive ferrule 24, which in turn provides electrical connection to the electrically conductive fluid disposed inside the inner hose member 30. The construction of the toroid 40 is clearly shown in cross-section in FIG. 5. Before the insulating material 50 is utilized, one electrically conductive wire 52 is affixed in a conventional manner (soldering or welding) to the upper surface 46 and a second electrically conductive wire 54 is affixed to the lower surface 48 making electrically conductive contact therewith. The wires 52 and 54 extend beyond the toroid 40 for a desired length, wherein a plug 56 is affixed thereon with one conductive wire 54 being connected to the shield portion 58 and the other wire 52 being affixed to the tip portion 60 of the plug 56. The top or upper portion 46 of the toroid 40 is maintained as the positive connection while the bottom or lower portion 48 is maintained as the negative connection. Upon leakage of the electrically conductive fluid through the hose wall of the inner hose member 30, the electrically conductive fluid comes into contact with the inside portion of the outer electrically conductive hose member 34 causing a sudden change that is detected through the related electrical sensing circuitry disclosed in FIG. 6, which will be explained hereinafter, and may further include, a plurality of selected output devices, not shown, to indicate a leakage condition, which may also include a device for stopping the flow of the conductive fluid.

Figure 6:
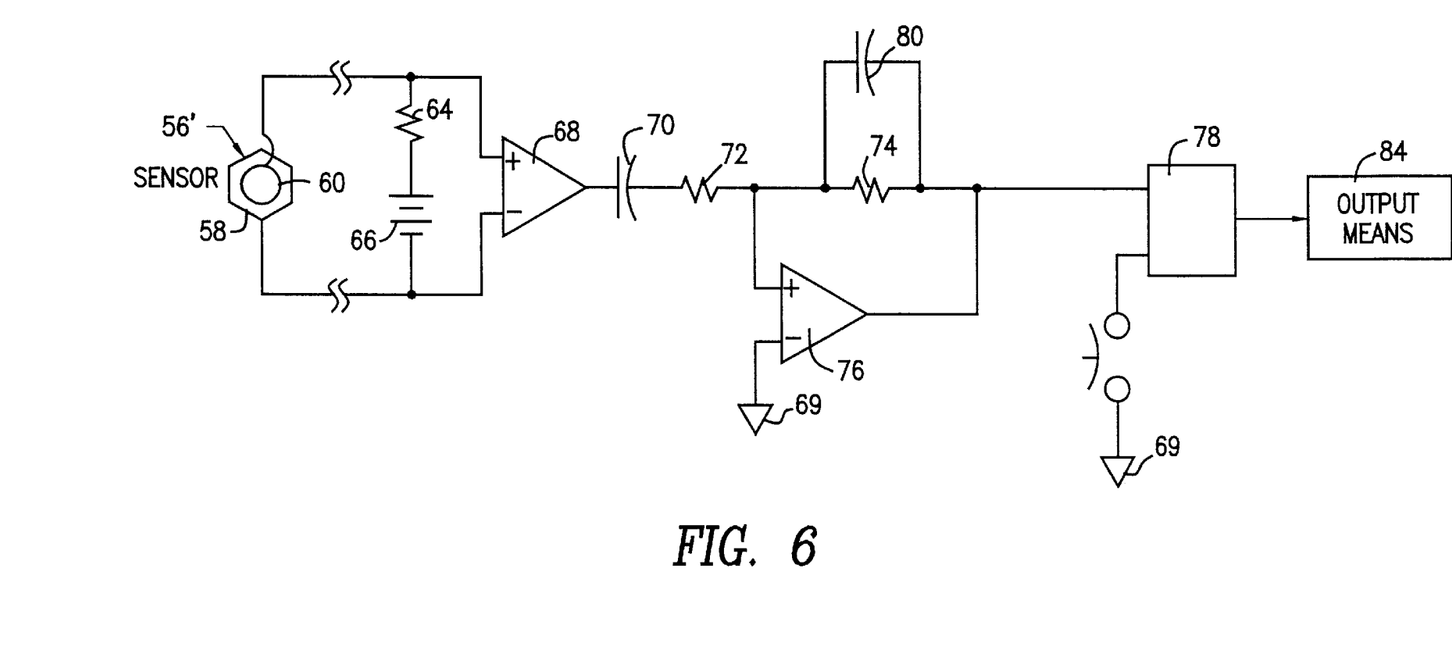
FIG. 6 is a schematic circuit diagram of a sensing apparatus for providing an output indication when the conducting fluid leaks out of the inner container.

Referring now to FIG. 6, in which is shown a sensing circuit with a receptacle 56' adapted to receive the plug 56 therein with the positive connection being coupled through a high impedance resistor 64 to the positive side of a battery 66, preferably 1.5 volts. The positive side of wire 60 is also coupled directly to the positive side of a high impedance operational amplifier 68 and ground 69, with the negative side of the amplifier 68 being connected to the negative side of the battery voltage 66.

The high impedance operational/differential amplifier 68 isolates the sensor from the circuit common 69, which may or may not be connected to the circuit chassis or earth ground. The capacitor 70 and resistor 72 function as a high pass filter that separates the transients from the D.C. bias and any low frequency electrical noise that may pass through differential amplifier 68. The resistors 72 and 74, and amplifier 76 amplify the signal pulse to a level that will set the output toggle circuit 78. The capacitor 80 and the resistor 74 function as a low pass filter that separates the signal pulse from any high frequency electrical noise that may get through the amplifier 68. The toggle 78 is a digital gate that latches out and has a high impedance when set and changes to a low value when reset. This serves to maintain an output means 84, such as an alarm until the reset button is set.

In the original design, if we assume that the non-leak resistance is from 10,000 ohms to infinity and a leakage resistance of from zero ohms to 100,000 megohms, then a battery voltage of 1.5 volts and a resistor 64 having a value of 1 megohm will produce a signal pulse of at least −1 millivolts. Although the battery can be an isolated power supply, a small long life battery will probably last for years, since the current drawn from the battery would be in the range of 1.5 microamps, maximum. With the amplifier 68 having a gain of 10 and a voltage supply of 18 volts would raise the bias to 15 volts and the signal pulse to −10 millivolts. These parameters are well within the limits of "off the shelf" differential amplifiers. Selecting the capacitor 70 and the resistance 72 for a time constant of 4 to 5 milliseconds, 4.7 microfarads, and 1,000 ohms that will filter out any 60 cycle noise, which may occur from power lines, as well as, remove the 15 volt D.C. bias from the −10 millivolt signal pulse. To obtain an inverted gain from the amplifier 76 of 1,000, the resistor 74 should be 1 megohm. This will raise the signal pulse to 10 volts, which is sufficient to set the output toggle 78. Utilizing a 0.001 microfarad capacitor 80, yields a time constant of 1 millisecond, and with the resistor 74 being 1 megohm, the signal pulse will pass through, but it will block any radio frequency or motor noise.

It is to be understood that although the disclosure is directed to specific hose embodiments, it is also suitable for use in detecting leakage from any container or reservoir.

Hereinbefore has been disclosed a liquid leakage sensor and a liquid sensing apparatus, which overcomes the shortcomings known in the prior art. It will be understood that various changes in the details, materials, arrangements of parts, and operating conditions, which have been herein described and illustrated in order to explain the nature of the invention may be made, by those skilled in the art, within the principles and scope of the instant invention.

What is claimed is:

1. A fluid leakage sensor, consisting of:
   A. an inner member means for containing an electrically conductive fluid, said inner member means being fabricated from a relatively high resistance material;
   B. an outer electrically conductive member, disposed about said inner member means, said outer electrically conductive member being fabricated from a material having a relatively low electrical resistance; and
   C. coupling means disposed on at least one end of said inner member means and said outer member for coupling a signal appearing across said outer member and said electrically conductive fluid contained within said inner member means to a sensing apparatus that is coupled to an output means.

2. A fluid leakage sensing apparatus, according to claim 1, further including means for providing an indication that the conductive fluid has leaked from said inner member means.

3. A fluid leakage sensing apparatus, according to claim 1, wherein said output means provides an audible indication.

4. A fluid leakage sensing apparatus, according to claim 1, wherein said output means provides a visual indication.

5. A fluid leakage sensing apparatus, according to claim 1, wherein said output means provides a control voltage means for activation of an electrical device.

6. A fluid leakage sensing apparatus, according to claim 1, wherein said inner member means and said outer member are connected across a voltage source of approximately 1.5 volts.

7. A fluid leakage sensor according to claim 1, wherein said inner member means is elongated and said coupling means is disposed on at least one end of said inner member means and said outer member, said outer member being adapted to be connected across a voltage source, wherein said coupling means is connected to a sensing means for sensing when said electrically conductive fluid leaks from said inner member means to said outer member.

8. A fluid leakage sensing apparatus, comprising in combination:
   A. an electrically non-conductive inner member means for containing an electrically conductive fluid having an electrically conductive ferrule disposed therein, said ferrule being in electrically conductive contact with said electrically conductive fluid;
   B. an electrically conductive outer member disposed about said inner member means having an electrically conductive clamping ferrule means disposed thereon for clamping said electrically conductive outer member and said electrically non-conductive inner member means upon said electrically conductive ferrule;
   C. said electrically conductive clamping ferrule means and said electrically conductive ferrule being adapted to be connected across a voltage source; and
   D. electrical circuit means for sensing when said electrically conductive fluid is leaking from said electrically non-conductive inner member means to said electrically conductive outer member.

9. A fluid leakage sensing apparatus, comprising in combination:
   A. an electrically non-conductive inner member means for containing an electrically conductive fluid having an electrically conductive ferrule disposed therein, said ferrule being in electrically conductive contact with said electrically conductive fluid;
   B. an electrically conductive outer member disposed about said inner member means having an electrically conductive clamping ferrule means disposed thereon for clamping said electrically conductive outer member and said electrically non-conductive inner member means upon said electrically conductive ferrule;
   C. said electrically conductive clamping ferrule means and said electrically conductive ferrule being insulated by an insulating means disposed therebetween, said insulating means being;
      i) a toroid having a centrally disposed aperture;
      ii) having a first conductive surface,
      iii) having a second conductive surface, and
      iv) having insulation disposed between said first conductive surface and said second conductive surface, adapted to be connected across a voltage source; and
   D. electrical circuit means for sensing when said electrically conductive fluid is leaking from said electrically non-conductive inner member means to said electrically conductive outer member.

10. A fluid leakage sensing apparatus, according to claim 9, wherein said first conductive surface and said second conductive bottom surface are adapted to receive wire conductors thereon for connection to said electrical circuit means.

* * * * *

UNITED STATES PATENT AND TRADEMARK OFFICE
CERTIFICATE OF CORRECTION

PATENT NO. : 6,112,579

DATED : September 5, 2000

INVENTOR(S) : Stephen A. Tryba

It is certified that error appears in the above-identified patent and that said Letters Patent is hereby corrected as shown below:

In The Abstract:
    Line 2: Delete "conductive or".
    Line 3: Delete "liquid" and insert therefor -- fluid --.
    Line 5: Delete the words "conducting or non-conducting" and insert therefor -- non-conductive --.
    Line 5: Delete the word "An".
    Line 6: Delete the words "electrical connection is" and insert therefor -- Electrical connections are --.

In The Specifications:
    Column 1 Line 28: Delete the term "polytetrafluorothyeme" and insert therefor -- polytetrafluoroethylene --.
    Column 2 Line 29: Delete the word "drawing" and insert therefor -- drawings --.
    Column 2 Line 32: Delete the word "DRAWING" and insert therefor -- DRAWINGS --.
    Column 2 Line 40: Delete the word "drawing" and insert therefor -- drawings --.
    Column 2 Line 55: Delete the word "conducting" and insert therefor -- conductive --.
    Column 3 Line 2: Delete the phrase "is electrically conductive".

UNITED STATES PATENT AND TRADEMARK OFFICE
CERTIFICATE OF CORRECTION

PATENT NO. : 6,112,579

DATED : September 5, 2000

INVENTOR(S) : Stephen A. Tryba

It is certified that error appears in the above-identified patent and that said Letters Patent is hereby corrected as shown below:

Column 3 Line 20: Delete the term "non-conducting" and insert therefor -- nonconductive --.

Column 3 Line 22: Delete the word "includes" and insert therefor -- may include --.

Column 3 Line 27: Delete the words "conductive outer" and insert therefor -- electrically conductive ferrule --.

Column 3 Line 33: Delete the word "liquid" and insert therefor -- ferrule members 24 and 36 --.

Column 4 Line 64: Delete the word "liquid" and insert therefor -- fluid --.

Column 4 Line 65: Delete the word "liquid" and insert therefor -- fluid --.

UNITED STATES PATENT AND TRADEMARK OFFICE
CERTIFICATE OF CORRECTION

PATENT NO. : 6,112,579
DATED : September 5, 2000
INVENTOR(S) : Stephen A. Tryba

It is certified that error appears in the above-identified patent and that said Letters Patent is hereby corrected as shown below:

Column 6 Line 43: Delete the word "bottom".

Signed and Sealed this

Fifteenth Day of May, 2001

Attest:

NICHOLAS P. GODICI

Attesting Officer     Acting Director of the United States Patent and Trademark Office